United States Patent
Thorsson

(10) Patent No.: US 10,384,236 B2
(45) Date of Patent: Aug. 20, 2019

(54) METHOD AND A SYSTEM FOR AUTOMATICALLY TRACING FOOD ITEMS

(71) Applicant: Marel Iceland Ehf, Gardabaer (IS)

(72) Inventor: Brynjolfur Thorsson, Reykjavik (IS)

(73) Assignee: MAREL ICELAND EHF, Gardabaer (IS)

( * ) Notice: Subject to any disclaimer, the term of this patent is extended or adjusted under 35 U.S.C. 154(b) by 0 days.

(21) Appl. No.: 14/647,553

(22) PCT Filed: Dec. 4, 2013

(86) PCT No.: PCT/EP2013/075474
§ 371 (c)(1),
(2) Date: May 27, 2015

(87) PCT Pub. No.: WO2014/086822
PCT Pub. Date: Jun. 12, 2014

(65) Prior Publication Data
US 2015/0314331 A1    Nov. 5, 2015

Related U.S. Application Data

(60) Provisional application No. 61/733,098, filed on Dec. 4, 2012.

(30) Foreign Application Priority Data

Dec. 4, 2012  (DK) .................. 2012 70753

(51) Int. Cl.
*B07C 5/34*        (2006.01)
*G05B 15/02*       (2006.01)
(Continued)

(52) U.S. Cl.
CPC .............. *B07C 5/34* (2013.01); *A22B 5/0064* (2013.01); *A22C 17/10* (2013.01); *B65B 57/00* (2013.01);
(Continued)

(58) Field of Classification Search
CPC .......... B07C 5/34; B65G 43/08; G05B 15/02; B65B 57/00; A22B 5/0064; A22C 17/10; G06Q 10/08
See application file for complete search history.

(56) References Cited

U.S. PATENT DOCUMENTS 5,478,990 A * 12/1995 Montanari ........... A22B 5/0064
235/375
6,104,966 A * 8/2000 Haagensen ............. A22B 5/007
221/1
(Continued)

FOREIGN PATENT DOCUMENTS

EP        2084968 A1    5/2009
JP     2001256292 A    9/2001
(Continued)

OTHER PUBLICATIONS

PCT International Search Report; Applicant: Marel Iceland Ehf; International Application No. PCT/EP2013/075474; Date of Actual Completion of International SearcH; Mar. 13, 2014; Date of Mailing International Search Report: Mar. 20, 2014.
(Continued)

*Primary Examiner* — Patrick Cicchino
(74) *Attorney, Agent, or Firm* — Workman Nydegger

(57) ABSTRACT

Provided is a method and a system for automatically tracing food items transported by a transporting mechanism such as a conveyor, where data attribute is acquired for the food items at at least one first position. The acquired data attribute is associated to the food items. A second data attribute of the same type(s) as the first data attribute is acquired at a second position and associated to the food items. A correlation is performed between the first data attribute and the second data attribute to determine if the data attributes match to determine if food items match. The correlation is performed
(Continued)

within a pre-defined correlation window around an estimated arrival point at said second position.

21 Claims, 3 Drawing Sheets

(51) Int. Cl.
    *B65B 57/00*     (2006.01)
    *B65G 43/08*     (2006.01)
    *A22B 5/00*     (2006.01)
    *A22C 17/10*     (2006.01)
    *G06Q 10/08*     (2012.01)

(52) U.S. Cl.
    CPC .............. *B65G 43/08* (2013.01); *G05B 15/02* (2013.01); *G06Q 10/08* (2013.01)

(56) References Cited

U.S. PATENT DOCUMENTS

| | | |
|---|---|---|
| 6,267,661 B1 | 7/2001 | Melville |
| 2007/0241901 A1* | 10/2007 | Cage ........................ G01S 13/82 340/572.1 |
| 2007/0260347 A1* | 11/2007 | Mirtsching ............ A22B 5/007 700/115 |
| 2010/0051513 A1* | 3/2010 | Skyum .................. A22C 17/008 209/10 |
| 2011/0054674 A1* | 3/2011 | Thorsson ........... A22C 17/0093 700/230 |
| 2013/0262330 A1* | 10/2013 | Sannier .................. G06Q 10/08 705/318 |
| 2014/0188905 A1* | 7/2014 | Bicknell ............. G06F 17/3053 707/749 |

FOREIGN PATENT DOCUMENTS

| | | |
|---|---|---|
| WO | 9854599 A2 | 12/1998 |
| WO | 0191565 A1 | 12/2001 |
| WO | 03077662 A1 | 9/2003 |
| WO | 2007072508 A1 | 6/2007 |

OTHER PUBLICATIONS

Danish Search Report; Application No. PA 2012 70753; Date of Completion of Search Report: Jul. 19, 2013.

* cited by examiner

METHOD AND A SYSTEM FOR AUTOMATICALLY TRACING FOOD ITEMS

CROSS-REFERENCES TO RELATED APPLICATIONS

This application is the national phase of International Application No. PCT/EP2013/075474 filed on Dec. 4, 2013, which claims the benefit of priority to Danish Patent Application No. PA 2012 70753 filed on Dec. 4, 2012 and U.S. Provisional Patent Application No. 61/733,098 filed on Dec. 4, 2012. The entire disclosures thereof are incorporated herein by reference.

FIELD OF THE INVENTION

The present invention relates to a method and a system for automatically tracing food items transported by a transporting means.

BACKGROUND OF THE INVENTION

Tracing food items through processing for record keeping is known in the art. This is of great importance in multiple cases, e.g. when food contamination is discovered somewhere in the supply chain. The ability to catalog food products through processing, such as mother origin of livestock, which slaughterhouse was used and the name of the worker can also help with maintaining good quality assurance and minimize the damage in case of any contamination. Moreover, after the slaughtering of the livestock each piece of the animal can further be traced and catalogued to produce traceable information regarding the origin of the food item as well as the process it has gone through during the processing in the processing plant. The sequential nature, i.e. first in first out principle, of the food processing makes it easy to keep trace of this information until the final product goes through a packing process.

WO0191565 discloses a process and an application for handling information in relation to meat being conveyed through a number of processing stations. The information is used to trace the processing history of a piece of meat, including its origination. The ability to trace the processing history may be used e.g. in order to trace back sources of contamination and for verification of the status and quality, weight etc. of the meat. The information is furthermore useful for the workers processing the meat at the stations or useful for the control and management of the meat processing plant.

WO03077662 discloses a method and a system for monitoring the processing of food items such as pieces of meat, including carcasses of pigs, calves, beeves and so on, also poultry, fish etc., where use is made of identification for the individual animal and/or the individual item or part item. The processing involves cutting-up into smaller pieces, inasmuch as a registration of identification for a piece of meat, a carcass or the like is effected. The piece of meat is allocated to one of a multiple of workstations, inasmuch as identification for the said workstation is registered and the allocated piece of meat is processed at the workstation while use is made of visual instruction. Hereafter, a further transport is established with traceability of the whole or parts of the yield from the cutting-up of the allocated piece of meat, such as one or more cuts.

The above mentioned methods and systems typically rely on sequential nature of the processing, e.g. the sequence of the incoming and the outgoing food items is preserved. A non-sequential nature can as an example occur when several food items undergo packing processing where the sequence of the packed food items is changed, i.e. the sequence of the packed food items coming out of the packing machine is not the same as the sequence of the incoming food items.

Such a non-sequential process is partly solved in WO2007072508 which relates to a method and a system for tracing food items, where information relating to food items going through processing is obtained by a control mechanism such as any processing device or an autonomous robot for transferring items. The placement or the position of the food items after the processing or the transfer is stored as traceable information for the transferred items in a data base and the information relating to the food items on arrival and the information after processing or transfer then contributes to historic information of the food items.

There are however situations where WO2007072508 fails, but this apparatus discloses, as all prior art apparatuses, that mechanical failures or human errors do not occur. This may e.g. be the case where a food item falls off a processing line/conveyor because of e.g. mechanical failure, food item is manually removed or any other reason resulting in that the sequence of the food items becomes disordered. In such instances, this missing food item cannot be identified. Other scenarios include when the process includes a manual processing step, e.g. when quality control is included in the process.

The inventor of the present invention has appreciated that there is thus a need for an improved way of carrying out both sequential as well as non-sequential tracing and has in consequence devised the present invention.

SUMMARY OF THE INVENTION

It would be advantageous to achieve an improved method and a system that is capable of performing a sequential and non-sequential tracing where among other things food items falling out of the initial sequence may be identified. In general, the invention preferably seeks to mitigate, alleviate or eliminate one or more of the above mentioned disadvantages singly or in any combination. In particular, it may be seen as an object of the present invention to provide a method and an apparatus that solves the above mentioned problems, or other problems, of the prior art.

To better address one or more of these concerns, in a first aspect of the invention a method is provided for automatically tracing food items transported by a transporting means, comprising:

acquiring at least one first attribute data for said food items at at least one first position and associate the acquired at least one first attribute data to the food items, acquiring at least one second attribute data of same or comparable type(s) as said at least first attribute data for said food items at at least one second position and associate the acquired at least one second attribute data to the food items, performing a correlation between said at least one first attribute data and said at least one second attribute data for said food items, where a match between at least one first attribute data and at least one second attribute data indicates that the food item having said associated at least one first attribute data and the food item having said associated at least one second attribute data is one and the same food item, wherein said step of performing said correlation between said at least one first attribute data and said at least one second attribute data for said food items is performed within a pre-defined correlation window around an estimated arrival point at said at least one second position.

Accordingly, the fact that the traceability is present at all times enables both sequential and non-sequential tracing. Moreover, means for e.g. recognizing if a given food item is not present at the second position within said correlation window is provided indicating that the food item has e.g. fallen off a conveyor. By utilizing said correlation window a kind of an arrival estimate at the second position is provided which makes the tracing more reliable, e.g. it is ensured that an accidental match with another food item at the second position does not occur.

Such a tracing is of outmost importance when food contamination is discovered where it is essential that the food items are labeled with information relating to, but not limited to, the origin of the food items, such as mother origin of livestock, which slaughterhouse, the processing history such as the name of the worker that processed the food item. In such cases it is possible to trace back sources of contamination. By having such a reliable tracing it is ensured that the correct labeling is present at all times.

By the term attribute type is preferably meant any characteristic property of the food items such as, but not limited to, the weight, the shape, the color, the volume and the like, or a combination of two or more thereof, i.e. anything that characterizes the food items. Moreover, the term comparable attribute type may be interpreted as an attribute that is acquired in a different way than the first attribute but where the resulting attributes are comparable. As an example, at a first position the items may be weighed and at the second position the volume of the food items may be estimated, and where a calculation is performed to make the two sets of data comparable, i.e. "volume" may be construed as the same type of attribute as the "weight".

Said transporting mean may be any means for transporting the food items, such as, but not limited to, manual transport where the items are transported from said at least one first position to said at least one second position, or it may be any type of a conveyor means such as a system where the food items are conveyed from said at least one first position to said at least one second position.

In one embodiment, said estimated arrival point is based on a time estimate indicating an estimated time needed for said food items to travel from said at least one first position to said at least one second position, said pre-defined correlation window being a time-window around said estimated time. By selecting an appropriate time-window the risk of confusion of two or more food items with almost identical attributes, which might otherwise indicate a match, may be reduced significantly compared to if no such time window is not present. This means that if a food item is delayed such that it falls out of the correlation window then it may be considered as being "lost" or not present. An example of a correlation window is a 10 seconds time window around the second position point and if a food item is not present at the second position within this time window is considered as being lost or not present.

In one embodiment, said estimated arrival point is based on a travel distance estimate indicating an estimated traveling distance needed for said food items to travel from said at least one first position to said at least on second position, said pre-defined correlation window being a distance-window around said estimated travel distance estimate. This may be of particular advantage where a given processing line includes a conveyor that starts and stops on irregular basis, e.g. a buffer conveyor. In such cases it would be impossible to define a consistent time-window. Instead the traveling distance of the food items or the conveyor belt would be the appropriate measure. An example of a distance window around the second position is a 10 cm distance window, where if the food items are not within the distance window that are considered to be lost or not be present. This traveling distance may as an example be measured by, but not limited to, a tacho, an encoder device and the like.

In one embodiment, said pre-defined correlation window is a combination of said time-window and said distance-window where the distance window indicates the travelling distance of said conveyor means. Said conveyor means include in one embodiment at least two sequentially arranged conveyor means. This is of particular advantage when the processing system which includes as an example several conveyors that may be connected via e.g. a gutter mechanism that has a consistent time-window meaning that the traveling time from where the food-items leave the in-feed end into the gutter mechanism until it leaves it is approximately fixed, whereas the conveyors on the opposite ends of the gutter mechanism may be starting and stopping.

In one embodiment, said food items are transported in a non-sequential way where, due to at least one intermediate process step taking place between said first position and said second position, the sequence of the food items at said second position may be different from the sequence of the food items at said first position.

In one embodiment, at least some of said food items are distinguished via different characteristics and where based on the different characteristics the food items are assigned to one or more different destination areas, said second position where said second attribute data is acquired being at said one or more different destination areas. It is thus ensured that a particular food item is to be assigned to a particular processing station, e.g. different food items go to different packing machines, where via said tracing it is among other things possible to determine if the assigned food item has shown up at the assigned processing station.

In one embodiment, said second attribute data further includes a correction factor correcting for predicted deviations in the attribute data for the food items from said first position until the food items reach said second position. This may as an example be of relevance when the attribute data is the weight of the food items. When the food items undergo a packing process such as vacuum packing, the packing material contributes to the weight of the food items at the second position. Assuming as an example that several food items with weight ranging from 500-800 g are received by an operator that puts them into a bag and then into a vacuum apparatus without following the sequence of the incoming food items. This means that the sequence of the vacuum packed items coming out of the vacuum apparatus is not the same as the incoming sequence and moreover, the weight is not exactly the same because of the packing material. Mixing up the sequence can have severe consequences if the vacuum packed food items are to be labeled with information about the origin of the food items on the outside of the packing material, but it is very difficult if not impossible to do such labeling prior to the vacuum packing Accordingly, by utilizing said correction factor it is possible to identify these vacuum packed items in the sequence coming out of the vacuum apparatus by taking the additional weight into account.

Another scenario where it is of relevance to utilize said correction factor is where the food items are injected with liquid that is e.g. 10% of the initial weight, where this 10% may be corrected by adding 10% to the weight at the first position.

The attribute data should not be construed as being limited to the weight data, but any kind of attribute data may be utilized such as, but not limited to, the color of the food items, the geometrical shape and any type of information that somehow characterize the food items.

In one embodiment, in case a food item is detected to be outside of said correlation window it is considered as being non-traceable item. In that way, it is ensured that if a given food item is detected outside said correlation window at the second position it may be rejected. As an example, if the correlation window around the second position, which may be a packing machine, is 5 seconds and a food item expected to be at the second position is not within this time window it will be considered as being non-traceable items. Otherwise, a false tracing might occur which could have severe consequences if the traceable items would have associated information relating to origination, the processing steps such as at which processing station the food item was processed etc.

Based on the above, said method may be used as an autonomous method independent of the traditional tracing/tracking systems. It should however be noted that said method may also be used in combination with traditional tracing and tracking methods, e.g. to verify that the tracing and tracking from said first position to said second position was correct.

In one embodiment, the method further comprises:
comparing, upon acquiring first attribute data for a given food item, the acquired first attribute data with first attribute data of previous food items, the previous food items being food items that are estimated to lie within said correlation window upon arrival at said second position, and
determining whether said acquired first attribute data and first attribute data of a food item of said previous food items lie within a pre-defined similarity threshold range.

In that way, it is possible to identify food items that are too similar, e.g. have too similar weight, and that would be within the same correlation window at the second position.

In one embodiment, in case said determining results in that a food item of said previous food items has associated first attribute data that lies within said pre-defined similarity threshold range, said given food item which first attribute data was most recently acquired is halted or temporarily rejected. In that way it is possible to prevent that food items that might have very similar attributes are within the same correlation window, but too much similarity may result in a false labeling or tracing as an example. This may e.g. be the case where there is a sequence of primal parts, part 1, part 2 and part 3, where part 1 that was weighed first has the weight 2002.9 g, part 2 has the weight 2102 g and part 3 that has just been weighed is 2003 g. Assuming that the correlation window around the second position is a time window of 8 seconds and the time window from where the first and the last primal part was measured is 6 seconds, it is obvious that these three primal parts will be within this 8 seconds correlation window when they arrive at the second position. Accordingly, by rejecting part 3 from this sequence by e.g. moving it temporarily to a buffer, it is prevented that part 1 and part 3 will be within the same correlation window.

In one embodiment, said at least one first position comprise a halting and releasing mechanism for operating the halting and releasing of at least one food item from the at least one first position onto said transporting means, wherein the method further comprises:
comparing the at least one acquired first attribute data at said at least one first position with acquired first attribute data of at least one food item being transported by said transporting means to said at least one second position, said at least one transported food item being food item(s) that is/are estimated to lie within said correlation window upon arrival at said second position, said comparing being so as to determine whether said acquired first attribute data lie within a pre-defined similarity threshold range, and based thereon,
controlling, via said halting and releasing mechanism, the releasing of said at least one food item from said at least one first position onto said transporting means.

In one embodiment, said at least one first position is at least one workstation arranged along said transporting means and where said at least one food item is/are food item(s) that is/are processed at the at least one workstation.

It is thus possible to prevent that food items having too similar attribute data are within the same correlation window upon arrival at the second position. This is of particular advantage in food processing system where there are multiple of workstations, where it is now possible to control the releasing from the workstations in such a way that food items having too similar first attribute data will lie within the same correlation window. A standard tracking/tracing feature such as a tachometer and the like may be utilized to keep track of the food items on the conveyor.

Said at least one position may also be a single position where two or more attributes are acquired. As an example, one workstation may comprise means to acquire two different attribute data for two items, e.g. two food items having different weight. In that way, it is possible to control the releasing of these two food items if they are too similar, in this case, their weight is too similar so as to prevent that these two food items lie within the same correlation window upon arrival at the at least one second position.

According to another aspect, the present invention relates to a computer program comprising instructions for carrying out the above mentioned method steps when said computer program is executed on a suitable computer device.

According to a third aspect, the present invention relates to system for automatically tracing food items transported by a transporting means, comprising:
a first attribute determining means for acquiring at least one first attribute data for said food items at at least one first position and associate the acquired at least one first attribute data to the food items,
second attribute determining means for acquiring at least one second attribute data of same or comparable type(s) as said at least first attribute data for said food items at a second position and associate the acquired at least one second attribute data to the food items,
a processor for performing a correlation between said at least one first attribute data and said at least one second attribute data for said food items, where a match between at least one first attribute data and at least one second attribute data indicates that the food item having said associated at least one first attribute data and the food item having said associated at least one second attribute data is one and the same food item, wherein said step of performing said correlation between said at least one first attribute data and said at least one second attribute data for said food items is performed within a pre-defined correlation window around an estimated arrival point at said at least one second position.

In one embodiment, said first and second attribute determining means include weighing devices.

In one embodiment, said at least one first position comprise a halting and releasing mechanism for operating the halting and releasing of at least one food item from the at least one first position onto said transporting means, the system further comprising:

a processor for comparing the at least one acquired first attribute data at said at least one first position with acquired first attribute data of at least one food item being transported by said transporting means to said at least one second position, said at least one transported food item being food item(s) that is/are estimated to lie within said correlation window upon arrival at said second position, said comparing being so as to determine whether said acquired first attribute data lie within a pre-defined similarity threshold range, and a control unit for controlling, based on said comparing, said halting and releasing mechanism and thus the releasing of said at least one food item from said at least one first position onto said transporting means.

In one embodiment, said transporting system is a conveyor system where two or more workstations are arranged along the conveyor system and where said food items are food items that are processed at the workstations, said first positions corresponding to said workstations.

In one embodiment said transporting means is the conveyor system similar as described in EP2084968 where one and the same conveyor is used as an in-feed conveyor and the take-away conveyor and thus acts as a single primary conveyor, and where said workstations are arranged along this primary conveyor. The incoming food items may be a stream of food items that are conveyed be means of said primary conveyor. In this system, the food items are allocated at least partly by means of a computer system to one of said workstations where the food items are processed, e.g. cut and/or trimmed, resulting in one or more processed items. This operation may be based on which of the workstations has the current capacity to process the food items, i.e. the food items are assigned to those workstation that are available, or this assigning may specific be pre-defined, .e.g. the workstations have pre-defined processing role. After the operators have processed the food items information about a return for the at least one processed food item is registered in a computer system. This may be any type of information indicating that at least one food items has been processed at a given processing station and is ready to be released back to said primary conveyor. As an example, the information may be weight of the at least one processed food item, where the operator places the at least one processed food item onto the weighing means which sends the signal to the computer system. The weighing means may further comprise a short conveyor belt that is capable of halting the at least one processed meant on the short conveyor belt and is also capable for transporting the at least one processed food item back onto said primary conveyor. This may be fully automatized vie the computer system or be a semi manual operation where the operator at the workstation may via start/stop button halt and release the at least one processed food item. Accordingly, based on said information about a return the at least one food item is subsequently moved back to said primary conveyor means, where it is ensured that the food item will not overlap with other food items on the primary conveyor. One and the same processed food items may be assigned again to one or more other workstations where the processing is continued. Moreover, and as discussed above, the computer preferably also ensures that the at least one processed food item will not lie within the same correlation window if the food items on the primary conveyor have too similar associated attributes.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIGS. 1a,b shows flowcharts of two embodiments of a method according to the present invention of automatically tracing food items selected from a sequence of food items transported by a transporting means.

DESCRIPTION OF EMBODIMENTS

Figure 1A:
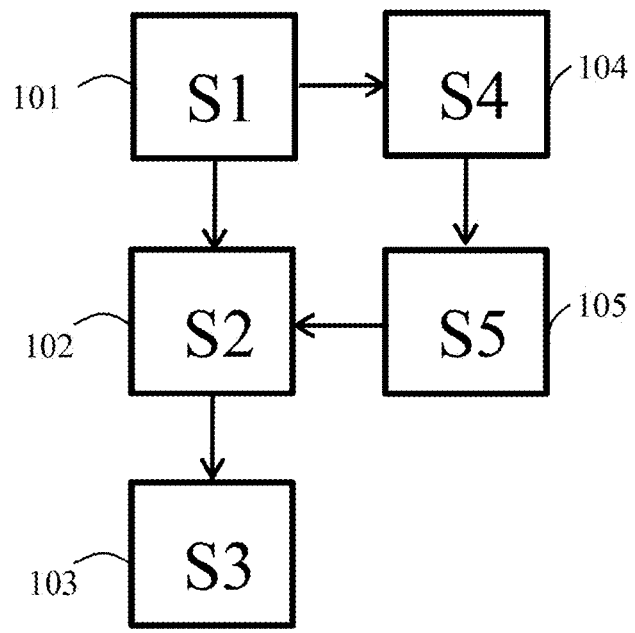

FIG. 1a shows a flowchart of one embodiment of a method according to the present invention of automatically tracing food items transported by a transporting means. The food items may be, but are not limited to, any type of meat items such as parts of beef, pork, lamb, poultry or fish products. Said transporting means may be any means such as manual transporting or it may be any type of conveyor means, such as a conveyor system comprising a conveyor belt. In the following, it will for simplicity be assumed that the transporting means is a conveyor.

In step (S1) 101, at least one first attribute data is acquired at at least one first position and associated to the food items. The first position may e.g. be multiple of processing stations positioned along said conveyor, where e.g. the attribute data is the weight of the processed food items that is acquired at the processing stations. Accordingly, multiple of first positions corresponding to the processing stations may be provided. There may also be a single first position where the attribute data for all the food items is acquired at the same position, an imaging device that capture image data of all incoming food items where the image data such as the color or the shape is the attribute data.

In step (S2) 102, at least one second attribute data is acquired of same or comparable type(s) as the first attribute data for the food items at at least one second position and associated to the food items. By the term "comparable type" is meant an attribute that has similar characteristics as the at least one first attribute type and that is acquired in a different way than the first attribute, but where the resulting attributes are comparable. As an example, the at least one second attribute type may the volume distribution of the food items that is determined with appropriate volume determining means, and based thereon the estimated mass of the food items is calculated, whereas the at least one first attribute may include the weight of the items that is measured by a weighing means. Another example is where X-Ray system is used to estimate the weight at the at least one second position, whereas a static or dynamic weighing device is used to measure the weight of the at least one food items at the at least on first position.

Similar as discussed in relation to step (S1) 101, the second position may be a single common position for all the food items or be several second positions, such as different packing machines.

In step (S3) 103, a correlation is performed within a pre-defined correlation window around an estimated arrival point at the at least one second position between the at least one first and the at least one second attribute data, where a match indicates that the food item having the associated at least one first and the food item having the at least one second attribute data is one and the same food item.

The term "match" may be understood as if the attribute values are within a certain range that e.g. takes into account uncertainty of the measuring devices, where e.g. an uncertainty of ±2% may be permitted. Thus, if the measuring device is e.g. a dynamic scale and the attribute is the weight, some uncertainty tolerance is allowed, i.e. the above mentioned 2%. This may also depend on the size of the products or the attribute type. If the attribute is e.g. the shape of the products or the color this uncertainty tolerance may be lower or higher.

The attribute may in one embodiment be the weight of the food items where the weight at at least one first position is compared with a weight of the food items at a second position via the above mentioned correlation within the correlation window. The correlation window may be selected from, but is not limited to, a time-window, a distance-window indicating the travelling distance of the conveyor means, or a combination of both.

In one embodiment, the method further includes, subsequent to step (S1) 101 and prior to step (S2) 102, two furthers steps. In step (S4) 104 includes comparing, upon acquiring attribute data for a given food item, the acquired attribute data with attribute data of previous food items. These previous food items that are estimated to lie within said correlation window upon arrival at the second position. In step (S5) 105 it is determined/calculated whether the acquired attribute data and attribute data of a food item of the previous food items lie within a pre-defined similarity threshold range. In case the determining results in that a food item of the previous food items has associated attribute data that lies within this pre-defined similarity threshold range, the given food item which attribute data was most recently acquired is temporarily rejected, e.g. automatically or manually moved into a buffer.

Figure 5:
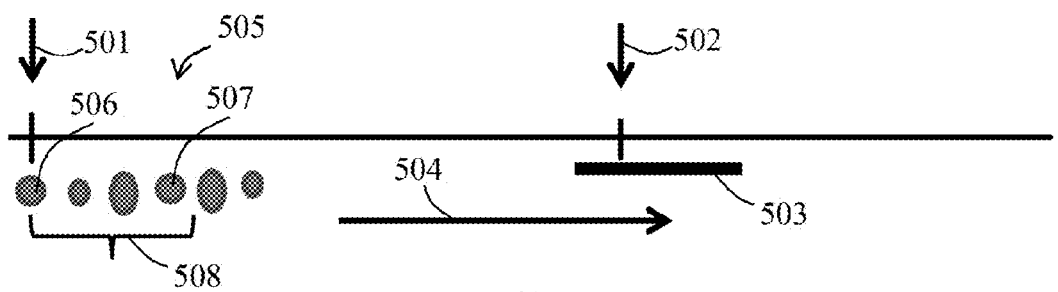
FIG. 5 depicts graphically a correlation window an estimated arrival point at a second position.

Steps (S4) and (S5) are depicted graphically in FIG. 5 showing a single first position 501 and a single second position 502. The first position may be a position where the weight of incoming items is registered (i.e. the attribute is the weight) and the second position 502 is a packing machine that e.g. vacuum packs the food items, where the vacuum packed items are weighed. The arrow 504 indicates the conveying direction of the food items. It will be assumed that the correlation window 503 around the second position 502 is a time window of 7 seconds.

Multiple of food items 505 are shown that have been weighed and are being conveyed from the first position 501 towards the second position 502. The weight of the food item 506 that has just been acquired is compared with the food items that are within a correlation window indicated by the bracket 508, which in this example may be a 7 seconds time window, or less, but the food items within this bracket 508 will at some later time be within the correlation window 503 around the second position 502. The weight value of the food item 506 is compared with all the food items that are within the 7 seconds bracket time window. In this case, the weight of the food item 506 is almost identical with the weight of the food item 507. Thus, if nothing is being done, both these food items will be within the same correlation window 503 and thus may, after undergoing the packing process, be mixed up after the vacuum packing Thus, in order to avoid such a mixing the food item that has just been weighed 506 is rejected and e.g. moved to a buffer, and reintroduced into the process at some later time.

As already addressed, the attribute window 503 may just as well be a distance window of e.g. 12 cm around the second position and similarly the bracket window 508 is a distance window of e.g. 12 cm or less.

Also, more than one attributes may be acquired at the first and the second position, respectively, e.g. the weigh and the color of the food items. This means that both these attributes must match if the food item at the first and second positions is one and the same food item.

Figure 1B:
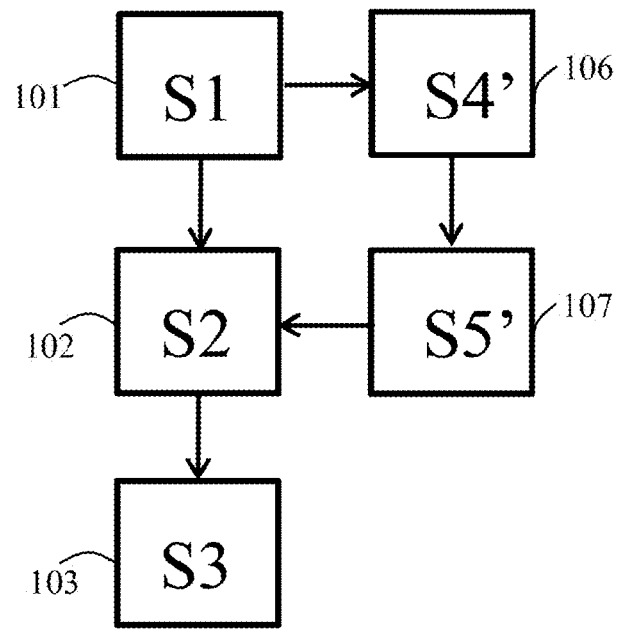

FIG. 1b shows a flowchart of another embodiment of a method according to the present invention of automatically tracing food items conveyed by a conveyor means. In this embodiment, the at least one first position comprises halting and releasing mechanism, that will be discussed in more details in relation to FIG. 6, for operating the halting and releasing of at least one food item from the at least one first position onto said conveyor means.

Steps (S1) to (S3) are similar to the steps discussed in relation to FIG. 1a starting with acquiring the at least one first attribute at the at least one first position, acquiring the at least one second attribute at at least one second position and performing the correlation in (S3) 103.

In this embodiment, the at least one first position may be multiple of workstations that are arranged along a conveyor (not shown), each of which represent a single first position. The at least one first position may also be a single first position.

Step (S4') 106 includes comparing, subsequent to step (S1) 101, the at least one acquired first attribute data at the at least one first position with acquired the at least one first attribute data of at least one food item being conveyed by the conveyor means towards the at least one second position and that is/are estimated to lie within said correlation window upon arrival at the second position. The aim with this comparing is to determine whether the acquired at least one first attribute data at a given at least one first position lies within a pre-defined similarity threshold range, i.e. it is checked whether the at least one first attribute data at the at least one first position is too similar to the attribute data of said food items that are being conveyed.

The food items on the conveyor means are preferably traced/tracked at all times so as know their exact position on the conveyor means. This may e.g. be based on monitoring the position where they are released and based thereon and utilizing the appropriate means such as tachometer to keep track of them at all times.

As an example, if at a given workstation a food item is weighed (the attribute is the weight, but the attribute is of course not limited to weight), it is checked whether the weight of this food item is too similar to the weight of food items arranged in the proximity of this work station having the weight obtained e.g. at previous workstations arranged along the conveyor means.

Step (S5') includes utilizing this comparing to control the releasing of the food item(s) from the at least one first position onto the conveyor means, via the halting and releasing mechanism, so as to ensure that only one of the food items lie within a pre-defined similarity threshold range and are estimated to lie within said correlation window upon arrival at the at least one second position. Referring to the example above, it is ensured that the releasing is controlled in a way that two food items with too similar attribute values will not be within the same correlation window upon arrival at the at least one second position.

Begin Example 1-Correlation Window is a Time-Window:

The attribute data is the weight of the food items. The first incoming food items are item 1, item 2, item 3 and item 4. The registered weight at a first position (where the first weighing device is positioned) gives the following weighing results: food item 1=3001 g, food item 2=3300 g, food item 3=4120 g and food item 4=2050 g, but these food items may as an example be different parts of a carcass such as flank, sirloin, rib and chuck. The weighing data are just randomly selected. These food items are to be moved to different processing locations, corresponding to said at least one second position. At these several second positions the food items are further processed or packed. Assume that the number of processing locations is four where at each processing location there is a second weighing device that measures the second attribute data, in this case the weight.

A correlation window, in this case a time window, is defined around the second position. The selection of the time-window may depend on the traveling time for the food items to travel from the first position to the second position. As an example, the shorter the traveling time is the narrower will the time-window be, and vice verse, the longer the traveling time is the wider will the time-widow be. This time-window may also vary depending on the type of food item because one processing location (one second position) may be positioned closer to the first position that another processing location (another second position). Thus, for the processing location being closer to the first position the time-window may be narrower because of shorter traveling time.

Assuming that there is only one time-window of 7 seconds around the second position, the weight at the processing stations, i.e. at the second position, is measured and correlated with the incoming weights at the first position, i.e. it is checked if a weight value of a food item that was weighed at the first position is detected within this 7 seconds time-window at the second position. There is an estimated arrival point, i.e. the food item should be present at the second position. As an example, the estimated arrival point might be 22 seconds and where the correlation interval is 2 seconds before this 22 seconds and 5 seconds after, i.e. the correlation window is from 20 seconds-27 seconds. If this weight value that was acquired at the first position is not detected within this time-window the food item is deemed to be lost. This may e.g. be because it fell of the conveyor during the conveying from the first position towards the second position. In that way, it may be detected if a food item is missing.

If however this food item is detected within this time-window information such as, but not limited to, the origination of the food item such as from which farm it originates or from which animal, may be associated to this food item at the second position when it e.g. undergoes a packing and subsequently labeling process where the label contains this information or part of this information.

Figure 3:
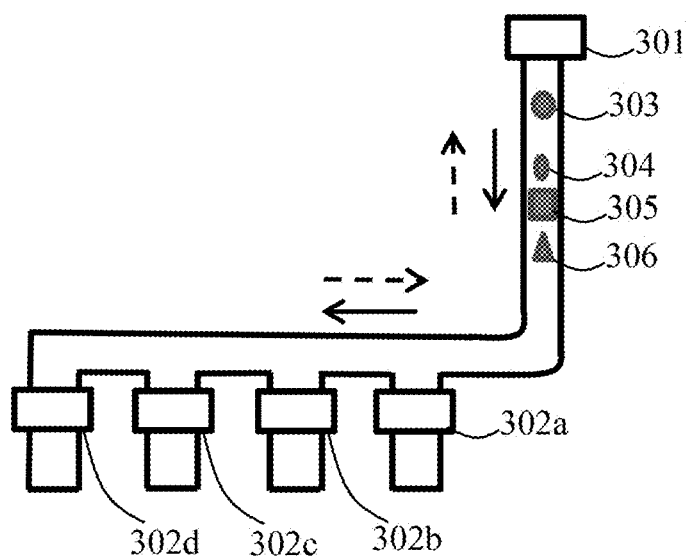
FIGS. 3 and 4 illustrate examples of how to implement the automatic tracing according to the present invention.

This example 1 is depicted graphically in FIG. 3 showing where there is only a single first position 301 with a first scale but four second positions 302a-302d each of which is provided with a second scale, where the transport direction is indicated by the solid arrows.

It should be noted that the scenario depicted in FIG. 3 may just as well apply in the opposite direction as indicated by the dotted arrow, i.e. where there are multiple of first positions and only a single second position. This might e.g. be the case where there first positions are several workstations (in this case four) having multiple operators where e.g. the attribute may be, but is not limited to, the weight of processed food items that are released from the workstations and conveyed in a direction as indicated by the dotted arrows.

In both these scenarios it is of outmost importance that reliable tracing of the food items is provided at all times, because these food items might at the end of the processing be labeled with information relating to the origination of the food items, e.g. which farm the food item originates from, or from which animal the food items originate from, or from which lot number the food items originate from, just to mention few examples.

In another scenario (not shown here) there may be multiple of first positions and multiple of second positions.
End Example 1
Begin Example 2-Correlation Window is a Distance-Window:

Scenarios exist where it is more appropriate to use, instead of the time-window discussed above, a traveling-distance window. Some food processing systems use as an example buffer conveyor that collect food items via start/stopping feature. In such instances it is more appropriate to use distance-window as a correlation window indicating how many meters or e.g. how many revolution the sprocket wheel of the conveyor means has rotated. In that way, any types of "time delays" that occur because the start/stop of the buffer conveyor is taken into account.

Figure 4:
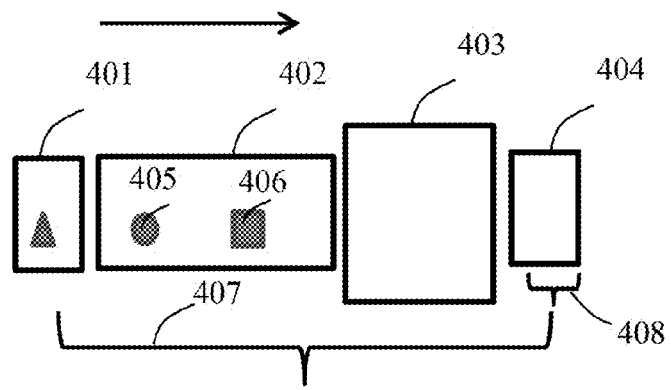

FIG. 4 depicts graphically an example of a food processing system including a weighing device 401 arranged at a first position, a buffer conveyor 402, a packing apparatus 403 and a weighing device 404 arranged at a second position. The conveying direction is indicated by the arrow. The buffer conveyor 402 may be operated in such a way that when no food items are coming it stops. Moreover, this buffer conveyor may be utilized to collect via starting/stopping several incoming food items prior to conveying them into the packing apparatus 403. The estimated traveling distance indicated by the bracket 407 from the first weighing device 401 to the second weighing device 404 may be 6.5 m, and the distance-window 408 may be 25 cm. This means that if a given weight value of an item X at the first position is detected within this 25 cm window around the 6.5 m point from the first position, i.e. if the correlation of the weight results in a match, this item at the second position is identified to be item X. This distance may be monitored vie e.g. an encoder or similar mechanism that e.g. monitors the revolutions of the conveyor belts, or via sensors placed along the conveyor system.

The sequence of the incoming food items 405 406 entering the packaging apparatus 403 may not be the same as the sequence coming out of the packaging apparatus 403. Moreover, if the packaging is a vacuum packing the food items typically need to be vacuum packed prior to the labeling process meaning that the vacuum packed items are somewhat heavier after the vacuum packing This change in the weight can be "leveled out" by taking this weight increase into account, e.g. by adding 20 g to the weight if on average only 20 g of plastic material used for the packing are being used. In that way, possible mismatches in the weight are avoided, and a reliable labeling with information about the origination of the food items is provided.

The applicant appreciates that the use of such buffer conveyors within the food processing is well known to a person skilled in the art and that this simple example is only to be considered as a simple illustration of the use of the present invention.

Moreover, the attribute value may just as well be color, shape or some means that identifies some characteristics of the food items that may uniquely identify them.

The above mentioned correlation windows should not be construed to be limited to only time-window or traveling-distance window, but the correlation window might just as well include a combination of both these windows.
End Example 2

Figure 2:
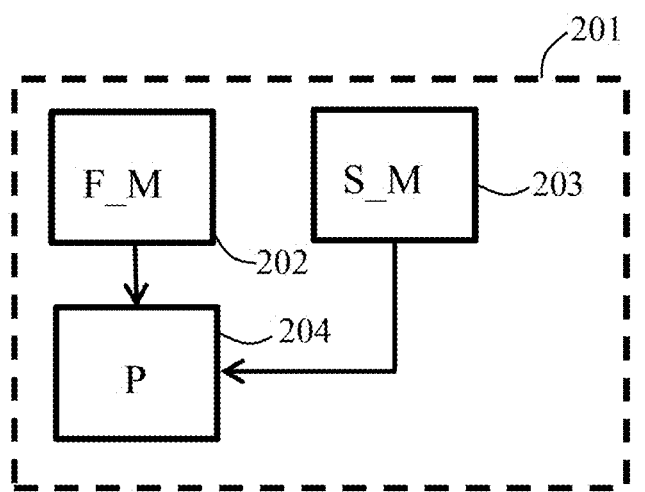
FIG. 2 depicts a system according to the present invention for automatically tracing food items selected from a sequence of food items.

FIG. 2 depicts a system 200 according to the present invention for automatically tracing food items transported by a transporting means. Again, for simplicity it will be assumed that the transporting means is a conveyor.

The system 201 comprises a first attribute determining means (F_M) 202, second attribute determining means (S_M) 203 and a processor (P) 204.

The first attribute determining means is adapted to acquire at least one first attribute data for the food items at at least one first position and associate the acquired at least one first attribute data to the food items. The second attribute determining means (S_M) 203 is adapted to acquire at least one second attribute data of same or comparable type(s) as the first attribute data for the food items at at least one second position and associate the acquired at least one second attribute data to the food items. The first and the second attribute determining means 202, 203 may be, but is not limited to, weighing means such as static weigher or dynamic weigher, or any kind of imaging means such as digital camera that is capable of detecting shaped and/or color, or a combination of two or more different attribute determining means.

The processor (P) 204 is adapted to perform a correlation between the at least one first attribute data and the at least one second attribute data for said food items. A match between at least one first attribute data and at least one second attribute data indicates that the food item having the associated at least one first attribute data and the food item having the associated at least one second attribute data is one and the same food item, wherein said step of performing said correlation between said at least one first attribute data and said at least one second attribute data for said food items is performed within a pre-defined correlation window around an estimated arrival point at said at least one second position.

Figure 6:
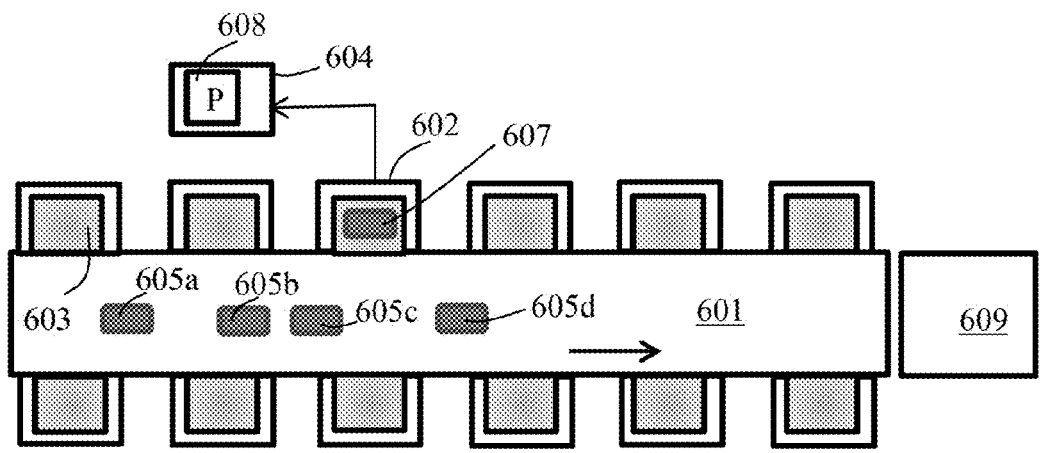
FIG. 6 shows one embodiment of a system according to the present invention.

FIG. 6 shows one embodiment of a system according to the present invention, where the system comprises a conveyor means 601, as shown here, a conveyor including a conveyor belt and multiple of workstations 602 arranged along the conveyor 601 where the food items are processed. Each workstation may correspond to a single first position and includes a controllable halting and release mechanism 603. A control unit 604 comprising a processor (608), e.g. a computer or industrial computer and the like, compares the acquired at least one first attribute data of the food items at the workstations 602 (the first positions) with the acquired at least one first attribute data of food items 605a-605c on the conveyor 601 that are estimated to lie within the correlation window upon arrival at the second position 602. It is preferably checked whether the at least one first attribute data for the food items at the workstations 602 lies within a pre-defined similarity threshold range. Based thereon, the control unit (604) operates the releasing of the food items 607 from the workstations onto the conveyor 601 so as to ensure that only one of the food items whose at least one first attribute data is within said pre-defined similarity threshold range lies within the correlation window upon arrival at the at least one second position. In the embodiment shown here, the food item 607 is e.g. weighed and the weight value is compared to the food items 605a-605d which have been released from previous workstations and are being conveyed towards the second position 609 as indicated by the arrow. As an example, if the food item 607 has a weight of 1350 g and the food item 605 has the weight of 1349 g, the control unit 604 will delay the releasing of the food item 607 onto the second conveyor 601 until it is ensured that these two food items will not lie within the same correlation window upon arrival at the second position 609. The second position may e.g. be a weighing device that is placed behind a packing machine (not shown). It should be noted that the position of the food items 605a-605d is known at all times by e.g. means of monitoring via the control unit from when they where released from the workstations and the traveling distance. As an example, the speed of the conveyor belt may be utilized to keep track of the food items 605a-605d at all times. Other means may be implemented for the purpose, such as utilizing tachometer or similar means.

An example of such a halting and releasing mechanism is a weight determining device comprised at workstations that are arranged along a conveyor. This weight determining means may comprise a scale that is provided with a short conveyor belt on top of the scale with a direction substantially perpendicular to the direction of the conveyor belt that can either halt or release the processed food product onto the conveyor 601. This halting and releasing may be fully operated by a computer system that operates the start/stop of the short conveyor belt, or it may be semi-automatic where e.g. an operator is informed via appropriate means such as red light if the halting is required and green light when releasing from the scale back to the primary conveyor is allowed, where the operators can via start/stop means operate this.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A method of tracking identities of a plurality of food items transported by a transporter, said method comprising the steps of:

automatically acquiring first attribute data for each one of said food items using a first characteristic detector at at least one first position and associating the acquired first attribute data to each respective one of the food items by action of a computer system that receives the first attribute data from the first characteristic detector;

automatically acquiring second attribute data of each one of said food items using a second characteristic detector at at least one second position and associating the acquired second attribute data to each respective one of the food items by action of the computer system that receives the second attribute data from the second characteristic detector, the second attribute data being of the same type or of comparable type as said first attribute data for each one of said food items;

performing a correlation by said computer system between said first attribute data and said second attribute data for each of the respective food items; and detecting by said computer a match between said first attribute data of at least one of said food items and said second attribute data of said at least one of said food items; and identifying said at least one of said food items as being one and the same food item based on the detected match between said first attribute data of said at least one of said food items and said second attribute data of said at least one of said food items without sequentially tracking said foot items; and wherein said step of performing said correlation between said first attribute data and said second attribute data for said food items is performed within a pre-defined correlation window around an estimated arrival point at said at least one second position.

2. A method according to claim 1, wherein said estimated arrival point is based on a time estimate indicating an estimated time needed for said food items to travel from said at least one first position to said at least one second position, said pre-defined correlation window being a time-window around said estimated time.

3. A method according to claim 2, wherein said pre-defined correlation window is a combination of said time-window and said distance-window.

4. A method according to claim 1, wherein said estimated arrival point is based on a travel distance estimate indicating an estimated traveling distance needed for said food items to travel from said at least one first position to said at least one second position, said pre-defined correlation window being a distance-window around said estimated travel distance estimate.

5. A method according to claim 1, wherein said food items are transported in a non-sequential way where, due to at least one intermediate process step taking place between said first position and said second position, the sequence of the food items at said second position may be different from the sequence of the food items at said first position.

6. A method according to claim 1, wherein at least some of said food items are distinguished via different characteristics and where based on the different characteristics the food items are assigned to one or more different destination areas, said second position where said second attribute data is acquired being at said one or more different destination areas.

7. A method according to claim 1, wherein said second attribute data further includes a correction factor correcting for predicted deviations in the attribute data for the food items from said first position until the food items reach said second position.

8. A method according to claim 1, wherein said first and second attribute data include the weight of the food items.

9. A method according to claim 1, in a case that a food item is detected to be outside of said correlation window it is considered as being a non-traceable item.

10. A method according to claim 1, wherein the method further comprises:

comparing, upon acquiring said first attribute data for a given food item, acquired first attribute data with first attribute data of previous food items, the previous food items being food items that are estimated to lie within said correlation window upon arrival at said second position, and determining whether said acquired first attribute data and the first attribute data of a food item of said previous food items lie within a pre-defined similarity threshold range.

11. A method according to claim 1, wherein said at least one first position comprises a halting and releasing mechanism for operating the halting and releasing of the at least one food item from the at least one first position onto said transporter, wherein the method further comprises:

comparing the at least one acquired first attribute data at said at least one first position with acquired first attribute data of at least one food item being transported by said transporter to said at least one second position, said at least one transported food item being food item(s) that is/are estimated to lie within said correlation window upon arrival at said second position, said comparing being so as to determine whether said acquired first attribute data lie within a pre-defined similarity threshold range, and based thereon, and controlling, via said halting and releasing mechanism, the releasing of said at least one food item from said at least one first position onto said transporter.

12. A method according to claim 11, wherein said at least one first position is at least one workstation arranged along said transporter and where said at least one food item is/are food item(s) that is/are processed at the at least one workstation.

13. One or more non-transitory computer-readable mediums having stored thereon executable instructions that when executed by one or more processors configure a system to carry out the steps of the method according to claim 1.

14. A method according to claim 1, further comprising transporting said food items with the transporter.

15. The method according to claim 1, wherein said at least one of said food items is identified as being one and the same food item without relying on the sequence of the food items transported by the transporter.

16. A method of tracking identities of a plurality of food items transported by a transporter, said method comprising the steps of:

automatically acquiring first attribute data for each one of said food items using a first characteristic detector at at least one first position and associating the acquired first attribute data to each respective one of the food items by action of a computer system that receives the first attribute data from the first characteristic detector;

automatically acquiring second attribute data of each one of said food items using a second characteristic detector at at least one second position and associating the acquired second attribute data to each respective one of the food items by action of the computer system that receives the second attribute data from the second characteristic detector, the second attribute data being of the same type or of comparable type as said first attribute data for each one of said food items;

performing a correlation by said computer system between said first attribute data and said second attribute data for each of the respective food items; and detecting by said computer a match between said first attribute data of at least one of said food items and said second attribute data of said at least one of said food items; and identifying said at least one of said food items as being one and the same food item based on the detected match between said first attribute data of said at least one of said food items and said second attribute data of said at least one of said food items; and wherein said step of performing said correlation between said first attribute data and said second attribute data for said food items is performed within a pre-defined correlation window around an estimated arrival point at said at least one second position, wherein the method further comprises comparing, upon acquiring said first attribute data for a given food item, acquired first attribute data with first attribute data of previous food items, the previous food items being food items that are estimated to lie within said correlation window upon arrival at said second position, and determining whether said acquired first attribute data and the first attribute data of a food item of said previous food items lie within a pre-defined similarity threshold range, and wherein in a case that said determining results in that a food item of said previous food items has associated first attribute data that lies within said pre-defined similarity threshold range, said given food item which first attribute data was most recently acquired is halted or temporarily rejected.

17. A system for automatically tracing food items transported by a transporter, the system comprising:

a first attribute detector that is configured to acquire first attribute data for each one of said food items at at least one first position and associate the acquired first attribute data to each respective one of the food items;

a second attribute detector that is configured to acquire second attribute data of each one of said food items at a second position and associate the acquired second attribute data to the food items, the second attribute data being of the same type or of comparable type as said first attribute data for each one of said food items;

a processor that receives said first attribute data output from the first attribute detector and receives said second attribute date output from the second attribute detector, and performs a correlation between said first attribute data and said at least one second attribute data for said food items, detects a match between first attribute data of at least one of said food items and said second attribute data of said at least one of said food items, and identifies said at least one of said food items as being one and the same food item based on the detected match between said first attribute data of said at least one of said food items and said at least one of said second attribute data of said at least one of said food items without sequentially tracking said foot items; and wherein said performance of said correlation between said first attribute data and said second attribute data for said food items is performed within a pre-defined correlation window around an estimated arrival point at said at least one second position.

18. A system according to claim 17, wherein said first attribute detector and second attribute detector include weighing devices.

19. A system according to claim 17, wherein said at least one first position comprise a halting and releasing mechanism for operating the halting and releasing of at least one food item from the at least one first position onto said transporter, the system further comprising:

the processor or another processor for comparing the acquired first attribute data at said at least one first position with acquired first attribute data of at least one food item being transported by said transporter to said at least one second position, said at least one transported food item being food item(s) that is/are estimated to lie within said correlation window upon arrival at said at least one second position, said comparing including determining whether said acquired first attribute data lie within a pre-defined similarity threshold range, and a control unit for controlling, based on said comparing, said halting and releasing mechanism and thus the releasing of said at least one food item from said at least one first position onto said transporter.

20. A system according to claim 19, wherein said transporter is a conveyor system where two or more workstations are arranged along the conveyor system and where said food items are food items that are processed at the workstations, said first positions corresponding to said workstations.

21. A method of using a computer system for automatically tracing food items transported by a transporter, said method comprising the steps of:

automatically acquiring first attribute data for each one of said food items using a first characteristic detector at at least one first position and associating the acquired first attribute data to each respective one of the food items for storing in a database by action of a computer system that receives the at least one first attribute data;

automatically acquiring second attribute data of each one of said food items using a second characteristic detector at at least one second position and associating the acquired second attribute data to each respective one of the food items for storing in a database by action of the computer system that receives the at least one first attribute data, the second attribute data being of the same type or of comparable type as said first attribute data for each one of said food items; and using the computer system for automatically retrieving said first attribute data and said second attribute date;

said computer system executing instructions for performing a correlation between said retrieved first attribute data and said second attribute data for each respective food item by performing the steps of:

matching, using the processor or another processor, said first attribute data of at least one of said food items to said second attribute data of said at least one of said food items, and determining, using the processor or another processor, that the food item having said associated first attribute data and the food item having said associated second attribute data is one and the same food item without sequentially tracking said foot items;

wherein said step of performing said correlation between said first attribute data and said second attribute data for said food items is performed within a pre-defined correlation window around an estimated arrival point at said at least one second position.

* * * * *